E. A. OLSEN.
LOCKING DEVICE FOR AUTOMOBILE HAND CONTROL LEVERS.
APPLICATION FILED MAY 17, 1917. RENEWED NOV. 3, 1919.
1,333,215. Patented Mar. 9, 1920.
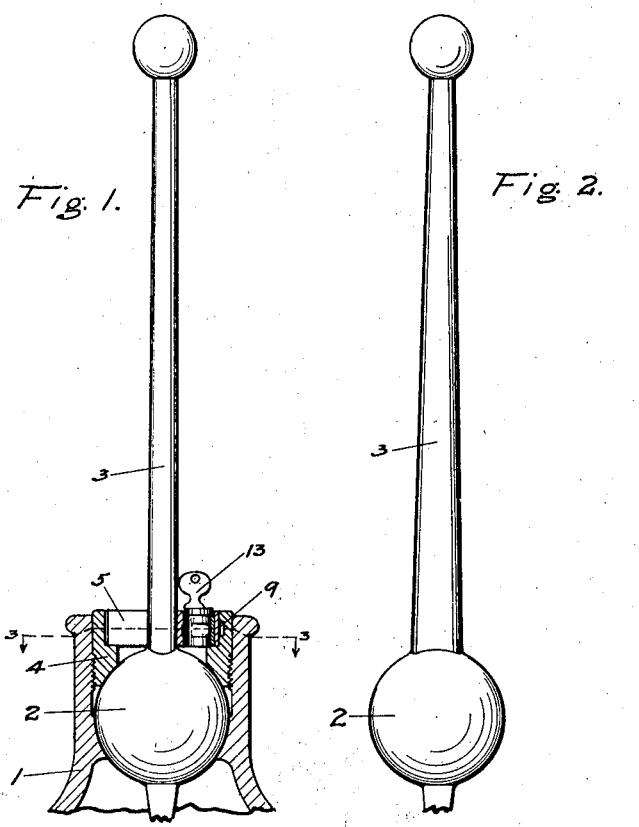
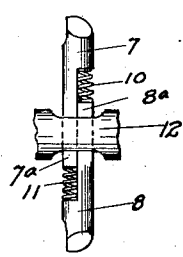
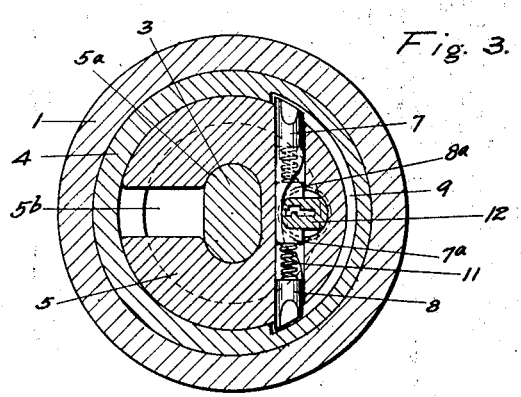
Edward A. Olsen
Inventor,
By
Atty.

UNITED STATES PATENT OFFICE.

EDWARD A. OLSEN, OF PORTLAND, OREGON, ASSIGNOR OF ONE-HALF TO H. M. COVEY, OF PORTLAND, OREGON.

LOCKING DEVICE FOR AUTOMOBILE HAND-CONTROL LEVERS.

1,333,215. Specification of Letters Patent. Patented Mar. 9, 1920.

Application filed May 17, 1917, Serial No. 169,287. Renewed November 3, 1919. Serial No. 335,280.

*To all whom it may concern:*

Be it known that I, EDWARD A. OLSEN, a citizen of the United States, residing in the city of Portland, county of Multnomah, and State of Oregon, have invented certain new and useful Improvements in Locking Devices for Automobile Hand-Control Levers, of which the following is a specification.

My invention relates to a locking device particularly adapted for locking the hand-control lever of an automobile in neutral position, whereby it is impossible to manipulate said hand-control lever, thus thereby making it impossible, even though the engine may be running, to move the machine.

One of the principal objects of my invention is to provide in combination with a lever and the support therefor, a locking member provided with an opening therethrough and adapted to fit around said lever, within said support, said locking member being provided with locking means formed as a part thereof for locking it to said support.

I have illustrated my invention on the accompanying sheet of drawings, as embodied for locking the hand-control lever of a Dodge Brothers' motor car, which I will now describe.

Figure 1 is a fragmentary, sectional view of the support, or socket member, for a hand-control lever, showing my invention applied thereto;

Fig. 2 is a side view of the hand-control lever;

Fig. 3 is an enlarged, horizontal sectional view, taken on line 3—3 of Fig. 1; and Fig. 4 is a detailed view showing the locking bolts and a portion of the tumbler for moving the same.

Referring now in detail to the drawings, my invention, as here illustrated, comprises a support, or socket member, 1, as now used on Dodge Brothers' motor cars, adapted to receive the pivot ball 2, of the hand-control lever 3, in the manner clearly shown. A special adjustment nut 4, is screwed into the socket member 1, as indicated, in place of the ball adjusting nut originally provided with the machine. This adjustment nut constitutes a part of the lever support and is adapted to receive a locking member 5, in the manner clearly indicated in Fig. 1. Said locking member 5 comprises a disk-like body provided with a central, elongated opening $5^a$, with an entrance opening $5^b$, whereby said lock 5 can be placed upon the lever 3 and dropped down into the upper end of the adjusting nut 4, the lever 3 being thus held firmly against movement from its neutral position, as clearly illustrated in Fig. 3. Said locking member 5 is provided with locking bolts 7 and 8, adapted when extended in the manner shown in Fig. 3 to fit at their outer ends into an internal groove 9, formed on the inner face of the adjustment nut 4, said bolts, as illustrated in Fig. 4, overlapping each other at their inner ends and being provided with expanding springs as 10 and 11, intended to normally move them apart and out into locking positions. Said bolts are provided on their inner overlapping ends, respectively, with hook-like portions $7^a$ and $8^a$, adapted to fit around an operating member 12, adapted to be controlled and turned by means of a key 13.

It will be evident, of course, that any desired key and tumbler mechanism may be used for operating the bolts 7 and 8 of my invention, whereby each lock will require its own particular key for moving its bolts into locked or unlocked positions.

I am aware that many changes can be made in my invention as here illustrated without departing from the spirit thereof, and I do not therefore, limit my invention, except as I may be limited by the hereto appended claims.

I claim:

1. In combination with a socket member and a hand-control lever therein for universal movement, an adjustment bearing member seated therein around said hand-control lever, and a locking member therefor comprising an independent member having a central opening with a radial entrance opening thereinto, whereby it can be placed on said hand-control lever, and adapted to seat down into said adjustment bearing member around said lever, and key-actuated locking means within said locking member and adapted to be moved outwardly into locking engagement with said adjustment bearing member, substantially as described.

2. In a device of the character referred to, in combination, a cup-like socket member, an operating lever having a pivot-ball seated in said socket member, an adjustment bearing nut having an open center and adapted to be screwed into said socket member over said ball, a disk-like locking member having an opening into its center and adapted to be placed around said lever and seated bodily down into said adjustment nut, and key-operated locking bolts forming a part of said locking member and adapted to be moved radially outwardly into locking engagement with the inside of said locking nut, substantially as described.

3. In combination, a socket member, a lever having a pivot-ball seated in said socket member, an adjustment nut above said pivot-ball and having an open center through which said lever projects, an independent locking member comprising a disk-like body having an open center with an opening leading thereinto from its outer edge, whereby said locking member can be placed at will around said lever and seated down into said adjustment nut, said locking member having locking bolts seated therein and adapted to have interlocking engagements at their outer ends with said adjustment nut, and means for operating said bolts, substantially as described.

4. Locking means for the hand-control lever of an automobile, comprising in combination with the socket member, and hand-control lever therein, of an adjustment bearing member seated in said member around said hand-control lever, and a locking member adapted to fit down into said adjustment bearing member and having an open slot adapted to receive said hand-control lever as said locking member moves down into said adjustment bearing member, for holding said lever against movement, and key-actuated locking means within said locking member and adapted to be moved outwardly into locking engagement with said adjustment bearing member.

Signed at Portland, Multnomah county, Oregon, this 11th day of May, 1917.

EDWARD A. OLSEN.

In presence of:
I. M. GRIFFIN,
J. C. STRENG.